J. J. Croy,
Tenoning Machine.
N°. 16,532. Patented Feb. 3, 1857.

UNITED STATES PATENT OFFICE.

JNO. J. CROY, OF CALEDONIA, MISSOURI.

TOOL FOR TENONING SPOKES.

Specification of Letters Patent No. 16,532, dated February 3, 1857.

*To all whom it may concern:*

Be it known that I, John J. Croy, of Caledonia, in the county of Washington and State of Missouri, have invented a new and Improved Device for Cutting Tenons on Spokes; and I do hereby declare that the following is a full, clear, and exact description of the same, reference being had to the annexed drawings, making a part of this specification, in which—

Figure 2:
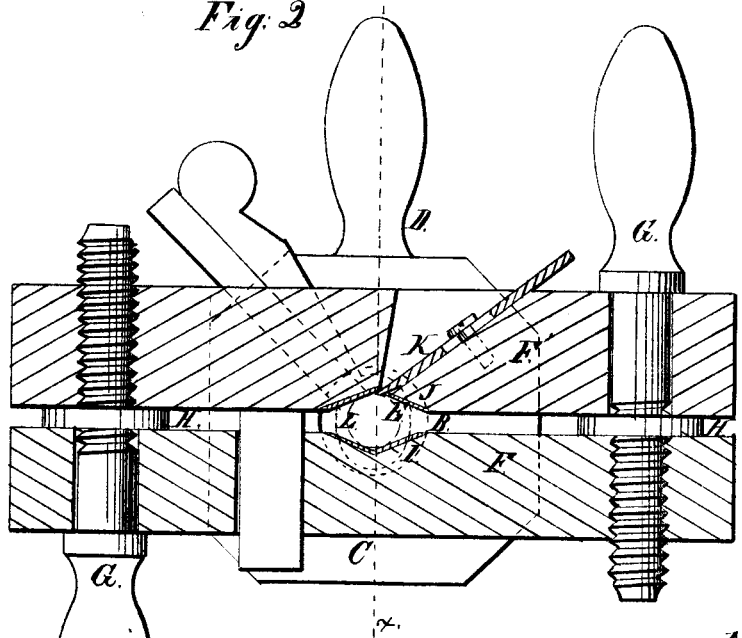
Figure 1:
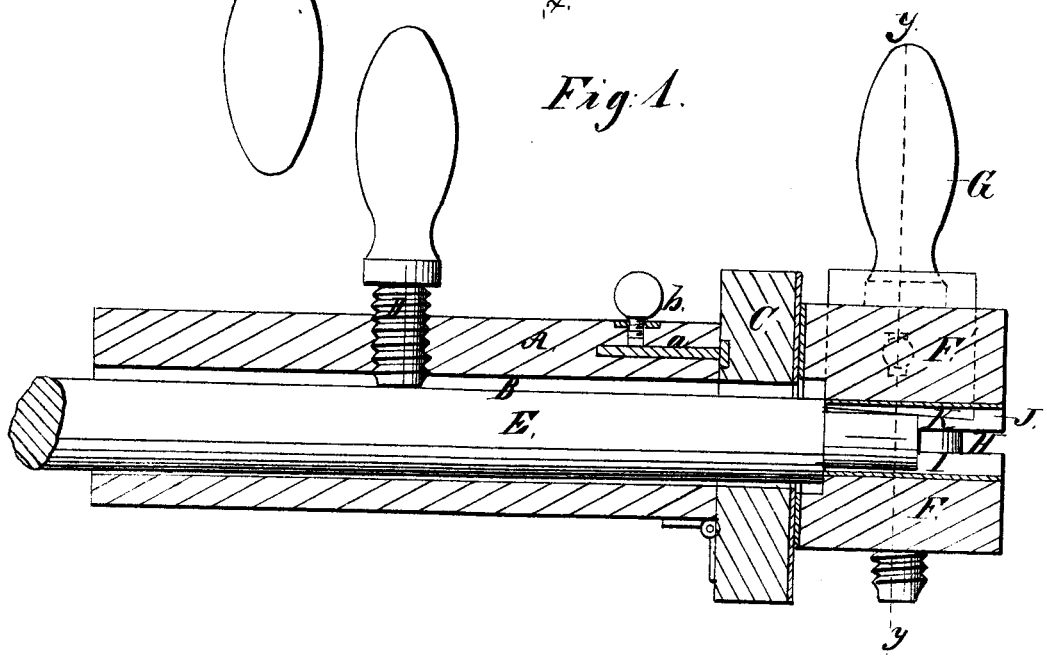

Figures 1 and 2, are vertical sections of my improvement, the planes of section crossing each other at right angles, *x*, *x*, and *y*, *y*, showing the planes of section.

Similar letters of reference indicate corresponding parts in the two figures.

To enable those skilled in the art to make and use my invention, I will proceed to describe it.

This invention consists, 1st, in the use of a tube for holding the spokes; 2nd, in combining an adjustable bed end-piece with the tube, for the purpose of insuring a proper dish-shape to the shoulder of the tenon; 3rd, in the employment of an adjustable clamp-cutter head for cutting the tenons.

A represents a rectangular bar which has a hole B, made longitudinally through it, thus forming a tube which receives the spoke.

C, is an adjustable end-piece or bed, which is hinged to one end of the bar A. This bed is merely a flat board having its outer surface faced with metal, a bar *a*, being attached to the inner side of the bed, said bar fitting in an opening in the end of the bar A, and being secured at any desired point therein, by a set screw *b*.

D, is a screw which passes transversely into the bar or tube A, said screw securing the spoke E, in the bar or tube A, as shown clearly in Fig. 1.

F, F', represent an adjustable clamp cutter-head, composed of two rectangular bars which are connected by hand screws G, G, said bars being secured at any desired distance apart by washers H, which are placed on the screws between the bars, as plainly shown in Fig. 2. To the bar F at about its center a V-shaped notch I, is shown, the sides of which the faced with metal and a similar notch J, is made in the other bar F', the sides of which are also faced with metal. The two notches are directly opposite each other, and a bit or cutter K, is fitted in the bar F', said bit or cutter being similar to a plane iron and extending the whole width of the notch J. A cutter L, is also fitted in the bar F', said cutter being placed at the end of the notch J, in a reverse position to the bit or cutter K, the cutting edge of the cutter L, being at right angles with the axis of the spoke.

The spoke E, is secured within the bar A, by the screw D, the end of the spoke projecting beyond the bed C, sufficiently far to allow the tenon to be of proper length. The bed C, is also adjusted so that the shoulders of the tenons may be more or less beveled according to the "dish" form of the wheel. The bars F, F', are then secured the proper distance apart, according to the desired thickness of the tenons to be cut, and the end of the spoke is placed in the ends of the notches I, J, and the bars F, F', are rotated, the bit or cutter K. and cutter L, cutting the tenon on the spoke.

The bit or cutter K, may be placed more or less obliquely in the bar F', so that a taper form may be given the tenons. The bars F, F', may be operated by hand or otherwise.

The above device is extremely simple, may be constructed by almost any mechanic, and tenons may be cut by it in an expeditious and perfect manner.

In the patent of John McCune, June 26, 1847, the spoke is secured by passing its ends between two rings or eyes; the spoke being clamped against the said rings by means of a screw, located between them.

The employment of a tube, as shown in my device, presents special advantages over the said McCune's device, for the following reasons:—The tube presents a solid bed, on which the tenon lies at nearly its full length, so that when the screw is applied, the spoke will not spring or bend in the center, and thus cause the tenon to be cut at the wrong angle. The tube also presents a greater bearing surface for the spoke, so that it may be more easily held firm, no matter how small its diameter, or how delicate or tough the wood. But, in McCune's device, the pressure of the screw causes the tenon to bend or spring in the center, and thus to destroy accuracy in the cut of the tenon. This difficulty is increased if the wood is tough, for it must then be held the tighter, else it will slip during the cutting operation, or if the wood is small, or soft, it the more readily springs, rendering it extremely difficult to be held. In McCune's device, also, it is necessary to have the eyes and screw secured to a separate bed-plate. But in my device, the screw is supported and works through the tube only; thus effecting a saving of parts, and rendering the machine more simple. McCune's method of holding the spoke prohibits the use of any means of regulating the "dish" or bevel of the shoulder of the tenon. But in my device, this is readily done by combining an end-piece C, with the tube, which is set, at pleasure, to a greater or less inclination from a right angle with tube A, according to the "dish" which is required. In McCune's device, the tenon is cut by a knife, which begins its work at the extremity of the spoke; the cutter-head being pushed up, as fast as it does the work, by the operator. In other words, McCune's cutter-head is a hollow mandrel, which is only capable of cutting a round and straight tenon. The beveled or tapering tenon cannot be cut with it. Besides, when a different sized tenon is wanted, a different-sized cutter-head and a different cutter must be applied,—which change consumes time, and involves the disadvantage of keeping on hand a variety of cutter-heads. The clamp cutter-head used by me has the following advantages over McCune's:—1st. One cutter-head and one cutter are sufficient for cutting all sizes of tenons. 2nd. The tenons may be cut with any desired bevel shape.

I do not claim the use of a screw, to hold the spoke against the interior of a tube or other surface. Neither do I claim, broadly, the use of a revolving cutter-head, to cut tenons upon spokes; the spoke being held stationary. Neither do I claim any portion of my device herein described, which is seen in Jno. McCune's patent, of June 26, 1847, or any part which exists in any other machine or instrument for cutting spokes; but

What I claim as my invention and desire to secure by Letters-Patent, is:

1. The employment of a tube A, for holding the spoke, while the tenon is being cut.

2. The combination of an adjustable end-piece or bed C, with the tube A.

3. The employment of an adjustable clamp cutter-head F, F'; all the above parts being constructed, arranged and operating as set forth.

JOHN J. CROY.

Witnesses:
 JAMES VINEYARD,
 JOHN TAYLOR.